(12) United States Patent
Steadman et al.

(10) Patent No.: US 6,980,152 B2
(45) Date of Patent: Dec. 27, 2005

(54) EXTERNALLY CUED AIRCRAFT WARNING AND DEFENSE

(75) Inventors: Robert L. Steadman, Mansfield, MA (US); Gary I. Grant, North Andover, MA (US); Bruce Edward Parks, Byfield, MA (US)

(73) Assignee: Textron Systems Corporation, Wilmington, MA (US)

( * ) Notice: Subject to any disclaimer, the term of this patent is extended or adjusted under 35 U.S.C. 154(b) by 0 days.

(21) Appl. No.: 10/613,612

(22) Filed: Jul. 3, 2003

(65) Prior Publication Data

US 2005/0001755 A1 Jan. 6, 2005

(51) Int. Cl.⁷ ............................................... G01S 7/36
(52) U.S. Cl. ............................. 342/14; 342/53; 89/1.11
(58) Field of Search .............................. 342/14, 15, 53, 342/65; 367/1, 124, 127; 89/1.11

(56) References Cited

U.S. PATENT DOCUMENTS

| | | | |
|---|---|---|---|
| 4,232,194 A | | 11/1980 | Adams |
| 5,361,072 A | | 11/1994 | Barrick et al. |
| 5,579,009 A | * | 11/1996 | Nilsson-Almqvist et al. . 342/53 |
| 6,173,074 B1 | | 1/2001 | Russo |
| 6,178,141 B1 | * | 1/2001 | Duckworth et al. ........ 367/127 |
| 6,192,134 B1 | * | 2/2001 | White et al. ................ 367/121 |
| 6,231,002 B1 | | 5/2001 | Hibma |
| 6,366,240 B1 | | 4/2002 | Timothy et al. |
| 6,369,885 B1 | * | 4/2002 | Brown et al. .......... 356/139.04 |
| 6,400,647 B1 | | 6/2002 | Huntress |
| 6,410,897 B1 | * | 6/2002 | O'Neill ................... 250/203.6 |
| 6,527,222 B1 | | 3/2003 | Redano |
| 6,531,965 B1 | | 3/2003 | Kaiser et al. |
| 6,621,764 B1 | * | 9/2003 | Smith ......................... 367/128 |
| 6,674,520 B2 | * | 1/2004 | Hicks et al. ........... 356/139.04 |
| 6,738,012 B1 | * | 5/2004 | Kirkpatrick .................. 342/67 |
| 2002/0149510 A1 | | 10/2002 | Salzeder |
| 2003/0038741 A1 | | 2/2003 | Greer |
| 2003/0068044 A1 | | 4/2003 | Nikolsky |
| 2004/0174290 A1 | * | 9/2004 | Longbottom ................. 342/65 |

FOREIGN PATENT DOCUMENTS

| | | |
|---|---|---|
| EP | 1455199 | 9/2004 |
| GB | 2342983 | 4/2000 |
| GB | 2380244 | 4/2003 |
| WO | WO2004/046750 | 6/2004 |
| WO | WO2004/109251 | 12/2004 |
| WO | WO2005/001374 | 1/2005 |

OTHER PUBLICATIONS

U.S. Appl. No. 60/452,716, filed Mar. 7, 2003.*
R.T. Pretty, et al., "Jane's Weapon Systems 1974-1975", Jane's Yearbooks, London, XP002339028.

* cited by examiner

*Primary Examiner*—Ian J. Lobo
(74) *Attorney, Agent, or Firm*—Lesley A. Hamlin

(57) ABSTRACT

Methods, computer-readable media, and systems for externally cued aircraft warning and defense are disclosed. A surveillance system may include a sensor field or array and may include a processor system that processes signals including acoustic signals received by the sensor array. Signals including acoustic signals are processed to determine the presence of indicia, including acoustic signatures, of known surface-to-air missiles including man-portable air defense systems. When the presence of such surface-to-air missiles is indicated, a cue signal is sent to one or more countermeasure systems that include one or more countermeasures such as chaff, expendable decoys and flares. The countermeasure systems may be ground-based or aircraft-based. The countermeasures are deployed in response to the cue signal. The surface-to-air missile may consequently be defeated.

44 Claims, 5 Drawing Sheets

EXTERNALLY CUED AIRCRAFT WARNING AND DEFENSE

BACKGROUND

Surface-to-air missiles, including certain types known as man-portable air defense systems can pose a threat to aircraft that are within the effective range of such missiles. For example, certain man-portable air defense systems such as the Stinger and SA series missiles, have altitude and horizontal or slant ranges of up to 15,000 ft and four miles, respectively. Such missiles can consequently threaten grounded or airborne aircraft within these ranges. Surface-to-air missiles may also be a threat to aircraft flying at altitudes below 15,000 feet in so-called landing and takeoff corridors before landing and after taking off, typically for horizontal ranges of up to 50 miles of a given landing or runway facility.

Certain autonomous infrared countermeasures (IRCM) are known and have been implemented on aircraft as fully independent aircraft defense systems. However these systems typically employ an active infrared detector array and associated mechanical and electro-optics systems and are therefore relatively expensive.

What is needed therefore are effective and inexpensive methods, computer-readable media and systems for defending aircraft, including civilian aircraft, against such surface-to-air missiles.

SUMMARY

The present invention is directed to methods, computer-readable media and systems for externally cued aircraft warning and defense.

A first embodiment may include a method for externally cuing one or more countermeasure systems and deploying one or more countermeasure to protect an aircraft against surface-to-air missiles. Signals may be acquired from one or more surveillance systems and a threat to an aircraft may be distinguished from the signals. A cue signal may be sent to one or more countermeasure system having one or more countermeasures, and the countermeasures can then be deployed.

Signals including radar signals, acoustic signals, magnetic signals, seismic signals, infrared signals, and visible light signals may be acquired by the one or more surveillance systems. A surveillance system may be deployed adjacent to an airport. Signals received by the surveillance system may be digitized and may be converted to a frequency domain. The signals may be converted to a frequency domain by using a discrete Fourier transform (DFT) including a fast Fourier transform (FFT). The signals may be filtered and a matched filter may be used to distinguish an acoustic signature of a surface-to-air missile. Digital filters may be used. A warning signal may be sent when threats of any kind are detected.

A second embodiment may include a computer-readable medium having computer-executable instructions stored thereon to perform the steps of acquiring signals from one or more sensors, distinguishing a threat from the signals, and communicating a cue signal to a countermeasure system. The countermeasure system may deploy a countermeasure in response to the cue signal.

The signals from the sensors may include radar signals, acoustic signals, magnetic signals, seismic signals, infrared signals, and visible light signals. The computer-readable medium may have instructions thereon to perform the step of digitizing the signals, producing a digital signal. Further instructions may include converting the signals to a frequency domain by a discrete Fourier transform (DFT) including a fast Fourier transform (FFT). The instructions may include filtering the digital signal by a digital filter including a matched filter. A matched filter may be used that corresponds to an acoustic signature of a known surface-to-air missile.

A third embodiment may include an externally cued aircraft warning and defense system. The system may include a surveillance system that is operable to detect one or more signals and to send a cue signal to a countermeasure system. The system may also include a countermeasure system that is operable to receive the cue signal from the surveillance system and to activate one or more countermeasure in response to the cue signal.

The surveillance system may include a sensor array. The sensor array may include one or more sensors including radar receivers, acoustic sensors, seismic sensors, magnetic sensors, and photodetectors. The photodetectors may include infrared detectors including one or more forward-looking infrared array. (FLIRs). The surveillance system may include a signal processor that is operable to process signals including acoustic signals acquired by the sensor array. The signal processor may include a matched filter, and may be operable to process acoustic signals received by the sensor array and to distinguish the presence of one or more threats to an aircraft. The signal processor may include a digital signal processor.

One or more of the countermeasure systems may be an aircraft-based countermeasure system with countermeasures including flares, infrared decoys, and/or chaff. One or more of the countermeasure systems may be a ground-based countermeasure system with countermeasures including infrared decoys and flares.

BRIEF DESCRIPTION OF THE DRAWINGS

These and other features, aspects, and advantages of the present invention will become better understood with regard to the following description, appended claims, and accompanying drawings. The drawings are not necessarily to scale, emphasis instead being placed upon illustrating the principles of the present invention. The drawings include the following:

DETAILED DESCRIPTION

Embodiments of the present invention are directed to the externally cued protection of aircraft against types of surface-to-air missiles (SAMs) including man portable air defense systems (MANPADS). Examples of such surface-to-air missiles include but are not limited to the US-made Stinger missile and the SA-series missiles made in the USSR.

Figure 1:
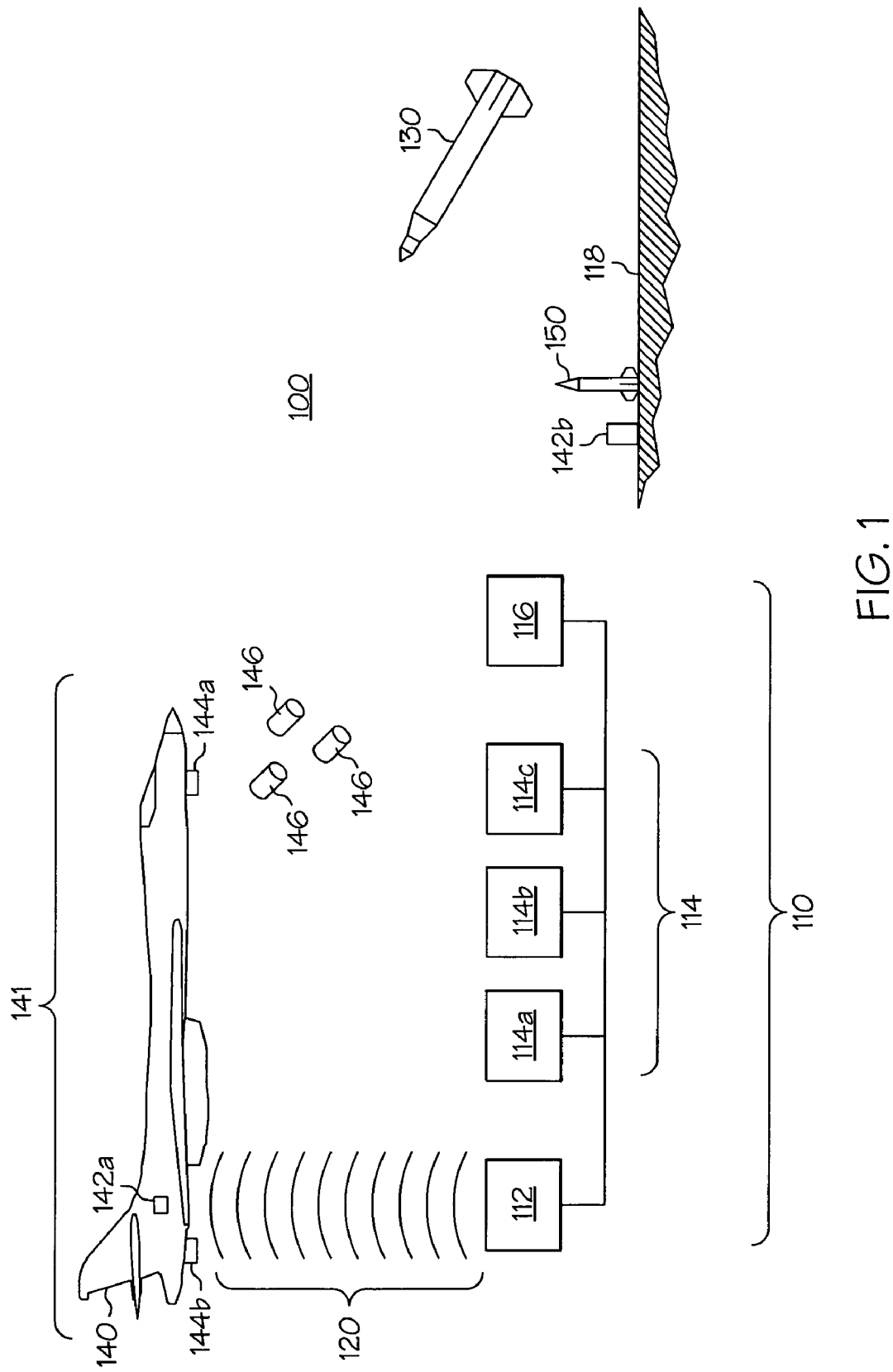
FIG. 1 is a conceptual diagram of an externally cued aircraft warning and defense system.

With reference to FIG. 1, an externally cued aircraft warning and defense system 100 will now be described. The system 100 may include a surveillance system 110 and one or more countermeasure systems 141, 150. The surveillance system 110 can be deployed to monitor areas adjacent to a runway 118 or other area of an airport or area in which planes land and take off. The surveillance system 110 may be deployed on the ground, on a building or other structure, on a vehicle, or any type of monitoring station.

The surveillance system 110 may include a communication system including a transmitter 112, a sensor field or array 114 of sensor nodes or sensors 114a–114c, and a processor system or signal processor 116. The communication system is operable to send or transmit a cue signal 120 to one or more countermeasure systems 141, 150 to trigger or externally cue those countermeasure systems 141, 150. Suitable countermeasure systems may include, but are not limited to ground-based countermeasure systems and/or aircraft-based countermeasure systems.

For example, in FIG. 1 an aircraft-based countermeasure system 141 is shown as deployed on the aircraft 140 and a ground-based countermeasure system 150 is shown near a runway 118. Countermeasure system 141 may include, but are not limited to, one or more dispensers or pods 144a–144b that hold guided-missile countermeasures 146 such as chaff, expendable active or "jammer" decoys, and/or flares. The countermeasure system 141 may include a radar jammer that is operable to emit a radar jamming signal, for example in the millimeter or Ka bands, to defeat or jam the guidance systems of radar-guided missiles. Suitable radar jammers may send a radar jamming signal based on threat frequencies that are known for specific surface-to-air missiles. The countermeasure system 141 may be activated in response to a cue signal received by the receiver 142a, 142b from the transmitter 112. For example, pods 144a–b may open to deploy the countermeasures 146 in response to a cue signal 120 received by the receiver 142 from the transmitter 112. The pods 144a–144b may be located strategically at multiple locations around the fuselage of the aircraft 140 to provide optimal protection against surface-to-air missiles 130. Ground-based countermeasure 150 may be illustratively an infrared jammer decoy.

With continued reference to FIG. 1, the array 114 of sensors is not limited to a particular size or configuration. For example, the array 114 may be part of an integrated unit including the signal processor 116 or may be spread out and linked by suitable communications link(s) to the signal processor 116. The communication system may be a wireless communication system and may include a receiver 142a that is located on one or more aircraft 140 and is linked to one or more aircraft-based countermeasure systems 141. The aircraft 140 may be landing or taking off from a runway 118 near the location where the system 100 is deployed. In certain embodiments, a receiver 142b may be linked to a ground-based countermeasure system 150.

The surveillance system 110 including any associated sensor field(s) or sensor array(s) may monitor a selected area to detect or ensure the absence of threats such as surface-to-air missiles including MANPADS, rocket-propelled grenades (RPGs), sniper fire, unauthorized personnel, etc. The absence of such threats may indicate that the monitored area is safe or "clean" and that nearby aircraft may proceed with landing or taking off.

In certain embodiments, one or more surveillance systems 110 may be pre-placed or pre-positioned as a sensor field near a particular runway at an airport. For example, in certain embodiments, one or more surveillance systems 110 may be pre-positioned at distances up to 10 kilometers or 6 miles from a particular runway or landing corridor. Such surveillance systems 110 may be positioned so that the flight path of any aircraft landing or taking off from the runway is located or vectored over the surveillance system(s) 110 in a desired manner. The surveillance system 110 including any related sensor field or sensor array may be located relative to the runway to minimize collateral effects on surrounding areas when associated countermeasures, e.g., flares 146, are deployed from aircraft using that runway.

Use of surveillance systems 110 near one or a few runways may reduce the cost of the system 100, while still providing the capability of protecting aircraft and defeating surface-to air missiles. Such use on one or a few runways may be used in situations including during periods of heightened national security. For example, aircraft at a particular airport may be directed to the runways that have the surveillances system(s) 110 deployed nearby when the Department of Homeland Defense issues a particular threat condition, e.g., a High condition, under the Homeland Security Advisory System.

The signal processor 116 of the surveillance system 110 may include one ore more microcontrollers, analog-to-digital (A/D) converters, field programmable gate arrays (FPGAs), digital signal processors (DSPs) or central processor units (CPUs). The signal processor 116 may also include read only memory (ROM), random access memory (RAM), and basic input output system (BIOS) functionality. Suitable DSPs may include, but are not limited to, 12-bit, 16-bit, 20-bit, and 32-bit DSPs.

The sensors 114a–114c may include, but are not limited to, acoustic, radar, seismic, magnetic, and photodetectors of any kind, including but not limited to, active infrared, passive infrared, and optical or visible light photodetectors. Forward-looking infrared arrays (FLIRs) may be used as suitable sensors in certain embodiments. The sensors 114a–114c may include acoustic sensors such as microphones to detect the acoustic signature of surface-to-air missiles 130 that threaten aircraft, e.g., aircraft 140, that are in the vicinity. In certain embodiments, the sensors 114a-114c may be part of an unattended ground sensor (UGS) system.

The sensors 114a-114c may detect signals or acquire data from sources within the vicinity of the surveillance system 110 and send corresponding signals to the signal processor 116. The signal processor 116 may detect indicia within the corresponding signals of one or more threats to the airplane 140 and thus detect the presence of those threats.

For example, the surveillance system 110 may include acoustic sensors that may detect acoustic signals within range of the surveillance system 110 and corresponding signals may be received by the signal processor 116, for example after analog-to-digital conversion. The signal processor 116 may locate and/or identify a source of the acoustic or other signals through signal processing techniques. The signal processor 116 may convert the acoustic or other signals to a frequency domain by known techniques and algorithms. The signal processor 116 may also compare the resulting frequency components of the acoustic or other signals to known templates, e.g., acoustic signatures, of known surface-to-air missiles. The surveillance system 110 may thus be able to detect the acoustic signatures or other characteristic signals of surface-to-air missiles during launch, before such missiles become airborne, and send a cue signal 120 to a countermeasure system 141, 150 to trigger the countermeasure system to protect the aircraft 140 against the surface-to-air missile.

The signal processor 116 may perform a comparison of the signals received from the sensors to characteristic indicia, signals or data of known threats. While suitable matched filtering or cross-correlation algorithms may be used for the comparison in certain embodiments, the comparison is not limited to a particular method and may include the use of image detection techniques. In certain embodiments, acoustic signatures of MANPADS may be detected. For additional details on acoustic signature recognition, see U.S. Pat. No. 6,173,074, entitled "Acoustic Signature Recognition and Identification" issued Jan. 9, 2001 to Russo, the contents of which are incorporated herein by reference.

The signal processor 116 may convert the received signals, e.g., acoustic signals, to a frequency domain by known techniques and algorithms such as Fourier, Laplace and Z-transform techniques and related algorithms. For example, the signal processor 116 may implement analog-to-digital conversion and then a discrete Fourier transform (DFT) or fast Fourier transform (FFT). Any suitable type of DFT or FFT algorithm may be used including, but not limited to, the decimation-in-time (DIT) and decimation in frequency (DIF) algorithms, as well as the Goertzel variant of the DFT algorithm. Peak detection algorithms may also be used. In certain embodiment, the signal processor 116 may include a Texas Instruments TMS320 C33 digital signal processor that implements a 2048-point FFT in assembly language or machine code.

The signal processor 116 may include digital filters including those that are specific to indicia, e.g., acoustic signatures, of known surface-to-air missiles. The signal processor 116 may also include digital filters that include infinite impulse response (IIR) functions or finite impulse response (FIR) functions. Such digital filters may include suitable window functions including but not limited to rectangular, triangular, Bartlett, Hanning, Hamming, Blackman, Kaiser and Chebyshev window functions.

Any countermeasure 146, 150 that can confuse or defeat radar-guided and heat-seeking missiles, including various classes of man-portable air defense systems, may be used. In certain embodiments, such countermeasures may include, but are not limited to, jamming signals, chaff, expendable decoys, and flares. In certain embodiments, infrared flares, e.g., made of magnesium, may be used as countermeasures and when dispensed, produce radiation in the detection spectrum of the missile to confuse and defeat the infrared tracking mechanism of the missile.

In certain embodiments, chaff may be used as a countermeasure 146 to act as a decoy for radar-guided missiles. Chaff typically consists of glass silicate fibers with an aluminum coating. After the chaff is ejected from the dispenser or pod, e.g., 144a, and into the aircraft slipstream, packages of chaff burst open to form a radar-reflective cloud called a chaff corridor. Each chaff package may be designed to simulate an aircraft and several aircraft with chaff can create a chaff curtain, consisting of thousands of false targets, which confuse the radar guidance package on a missile so they are unable to locate the real targets within the chaff cloud or corridor and consequently miss colliding with the aircraft.

The chaff fibers typically consist of approximately 60 percent glass fiber and 40 percent aluminum by weight. The fibers may be small strips of aluminum foil that act as electric dipoles. Such fibers may be cut to length to match the various wavelengths of a guided-missile missile radar system. Such half-wave dipoles are effective radar reflectors and may be designed according to the types of radar that are likely to be used by known surface-to-air missiles. For example, dimensions for chaff fibers to be used against a 10-GHz radar may be 0.6 inch long, 0.01 inch wide, and 0.001 inch thick. Relatively lightweight amounts of chaff may effectively protect aircraft. For example, only 0.1 pound may be needed to cause a radar echo equal in size to that of a large commercial jet airplane.

Figure 2:
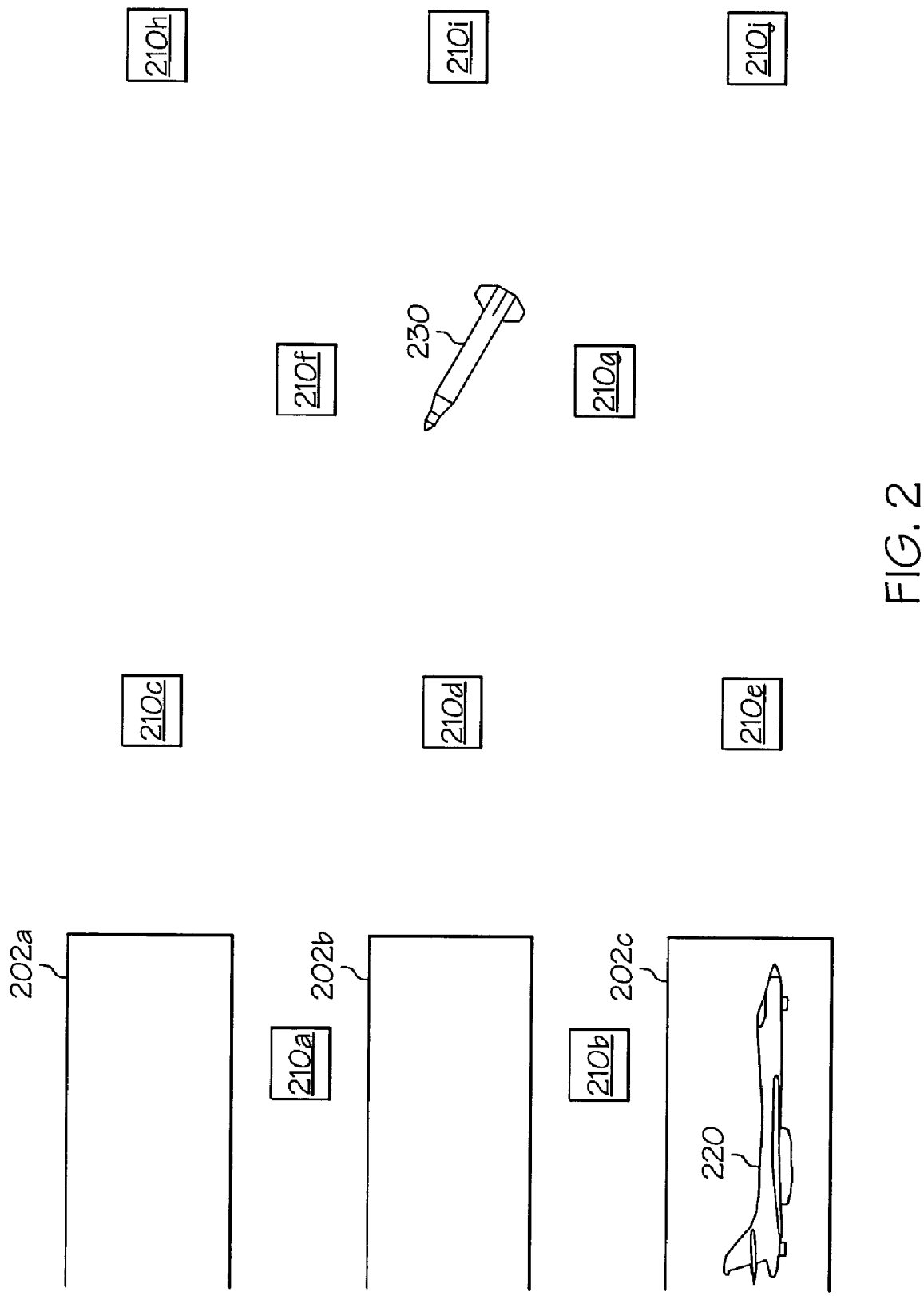
FIG. 2 is a plan view with multiple surveillance systems configured near representative runways.

Referring now to FIG. 2, a plan view of a portion of an airport that includes three representative runways 202a–202c is shown, with aircraft 220 located on runway 202c. Multiple surveillance systems 210a–210j similar to that of FIG. 1, are arranged near three representative runways 202a–202c. The surveillance systems 210a–210j may be positioned at locations near the runways 202a–202c or associated landing corridors to facilitate the processing of signals, e.g., optical, seismic, acoustic, radar, magnetic, etc., that indicate the presence of surface-to-air missiles 230 or other threats to the aircraft 220.

In certain embodiments, the distance between acoustic sensors used in one or more surveillance systems, e.g., surveillance systems 210a–210j, may be on the order of 1000 feet or less. Such distances may increase the margin of safety for deploying aircraft-based countermeasures used within the scope of the present invention. Because sounds travels at approximately 1000 feet per second, the time for detection of the sound of a launch of a man-portable air defense systems (MANPADS) may be 1 to 2 seconds for acoustic sensors that are spaced at 1000-foot intervals, depending on the location of the MANPADS launch to the nearest acoustic sensor. Estimates of the flight time of typical MANPADS are on the order of 3.5 to 5 seconds. Distances greater than 1000 feet, while within the scope of the present invention, may increase the time required to detect the acoustic signature of the surface-to-air missile, e.g., a MANPADS, and to send a cue signal to deploy an aircraft-based countermeasure.

Figure 3:
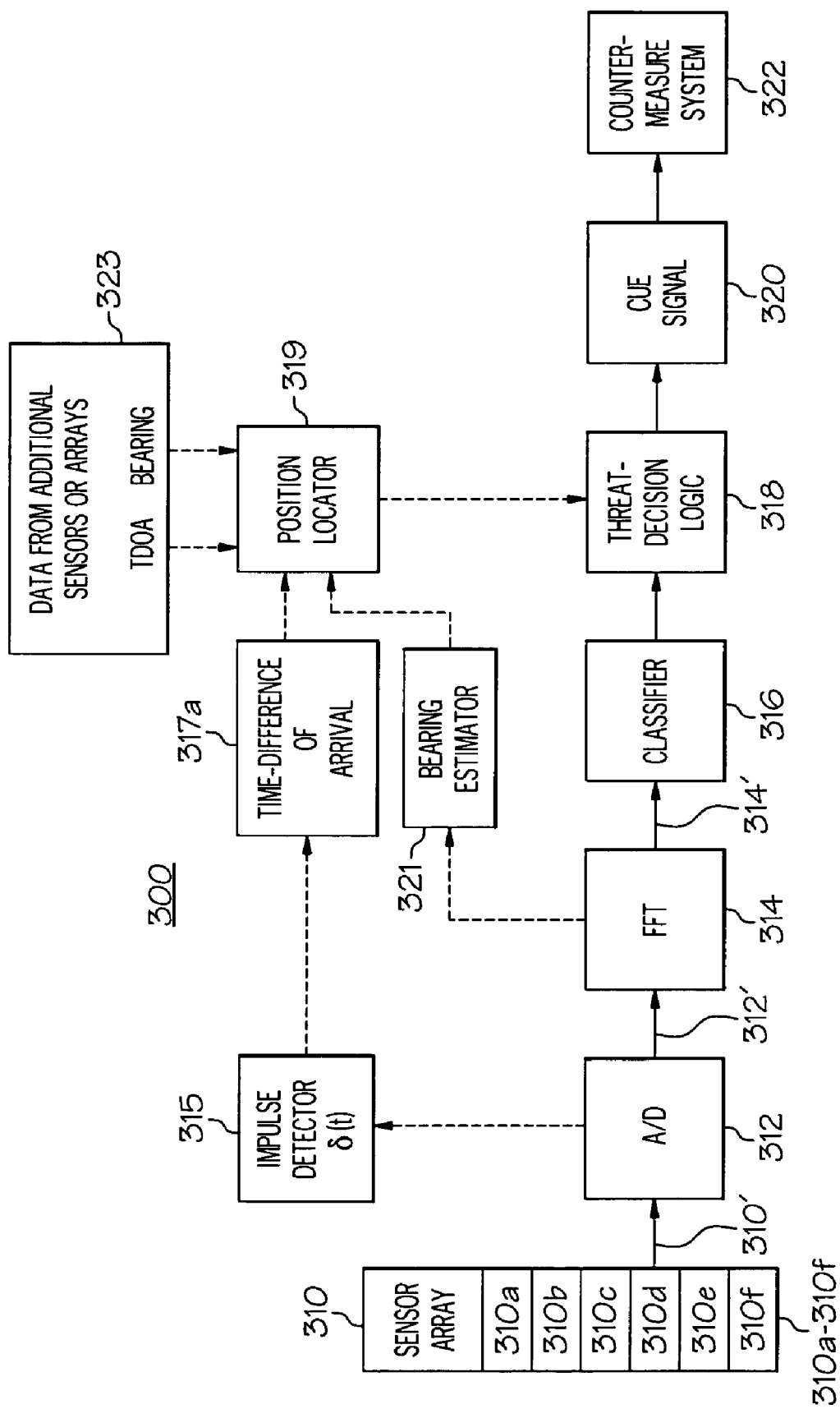
FIG. 3 is a conceptual diagram of functional components or blocks of an embodiment of an externally cued aircraft warning and defense system.

Referring now to FIG. 3, a schematic diagram is shown of functional components or blocks of an embodiment of an externally cued aircraft defense system 300. An array 310 of sensor nodes or sensors 310a–310f may be connected to a front-end block including an analog-to-digital (A/D) converter 312, similar to the embodiment of FIG. 1. The sensors 310a–310f receive signals from the environment within the range of the sensors 310a–310f. The sensor array 310 may send a signal 310' to the analog-to-digital (A/D) converter 312 to convert the signal to a digital signal 312'.

The digital signal produced 312' by the analog-to-digital (A/D) converter 312 may be converted to the frequency domain by the implementation of a fast Fourier transform (FFT) 314, other discrete Fourier transform algorithm, or a Z transform. For example, a digital signal processor may be utilized to perform the FFT 314. Once converted into its frequency components 314', the digital signal may be searched for indicia including frequency components that are characteristic of known surface-to-air missiles, e.g., searched for the acoustic signatures of known surface-to-air missiles including MANPADS.

When using acoustic sensors, the frequency components 314' may be compared to a library of one or more acoustic signatures of known surface-air-missiles and other threats by a classifier 316, which may be implemented for example in a processor such as signal processor 116 of FIG. 1. The classifier 316 may use known methods such as the use of matched filters or cross-correlations and/or other signal detection methods and algorithms to determine the presence of an acoustic signature of a surface-to-air missile. In this way, the classifier 316 may determine the presence of an acoustic signature of a known threat, e.g., a MANPADS.

The classifier 316 may also identify the acoustic signatures of other threats such as aircraft including helicopters and ground vehicles including tanks, trucks, cars, and motorcycles and the like. When such other threats are identified, a warning signal (not shown) may be sent to security forces that may be located nearby.

Once an acoustic signature of a surface-to-air missile is found, a threat-decision logic block 318 may cause a trigger or cue signal 320 to be sent to one or more countermeasure systems 322, for example, countermeasure systems that are onboard nearby aircraft or that are based on the ground. The countermeasure systems 322 may deploy countermeasures such as chaff, jamming signals, expendable decoys, and flares in response to receiving the cue signal 320. If no "hostile" acoustic signatures are found, no cue signal is sent to the countermeasure system 322. The system 300 may continuously monitor the runway or other area where the sensors of the system are deployed, regardless of whether a hostile acoustic signature is detected.

With continued reference to FIG. 3, in certain embodiments, as indicated by dashed lines, acoustic signals received from the array 310 may be processed in the time domain to detect and determine position information about a source of acoustic signals or an acoustic source. The sensors of the array 310 may be synchronized in time, for example by a signal from a global positioning system (not shown). Acoustics signals from the sensors 310a–310f of the sensor array 310 may be sent to an impulse detector 315 after digitization by the analog-to-digital converter 312. Because the sensors may be time-synchronized, the impulse detector 315 may detect an impulse generated by an acoustic source at different discrete times, depending on the location of the individual sensors 310a–310f relative to the acoustic source.

A time-difference of arrival algorithm or system 317 may operate to calculate time-difference of arrival information from the multiple impulse signals detected by the impulse detector 315. A position locator algorithm or system 319 may process and calculate the position of the acoustic source based on the time-difference of arrival information 317. The position of the acoustic source may be calculated relative to the physical location of any element of the system 300 or relative to an aircraft-based countermeasures system 322. The threat decision logic block 318 may use the position of an acoustic source as a factor in the determination of whether to send a cue signal 320 to nearby countermeasure systems 322.

For additional background on time-difference of arrival, see U.S. Pat. No. 6,336,240 to Timothy et al., entitled "Location of Aircraft with Time Difference of Arrival", the contents of which are incorporated herein by reference. See also U.S. Pat. No. 6,234,471 to Brandstein et al., entitled "Methods and Apparatus for Source Location Estimation from Microphone-Array Time-Delay Estimates", the contents of which are incorporated herein by reference.

In certain embodiments, a fusion algorithm or bearing estimator 321, indicated by dashed lines, may be implemented in suitable hardware or software to determine a bearing of an acoustic source based on spectral information from the FFT 314. The bearing estimator 321 may estimate a bearing of an acoustic source, e.g., based on the detection of offsets or shifts in the frequency components 314' of signals from one sensor in the array 310 relative to other sensors in the array 310. The bearing may be used by the position locator 319 to facilitate locating one or more acoustic sources. In certain embodiments, the position locator 319 may process data 323 from additional sensors or arrays for additional time difference of arrival (TDOA) and bearing information regarding acoustic sources.

The position of the acoustic source may be used by the threat-decision logic module 318 as an additional factor for the determination of whether the cue signal 320 should be sent to the aircraft-based countermeasure 322. For example, when the position of the acoustic source corresponds to an area or location that is known to be secured or free from surface-to-air missiles, the threat-decision logic module 318 may prevent a cue signal 320 from being sent the countermeasure system 322.

One of skill in the art would understand that the functions represented by the functional blocks in FIG. 3, are not limited to any specific hardware or software. For example, one of skill in the art should understand that the functions may be provided through the use of either shared or dedicated hardware, including, but not limited to, hardware including a computer-readable medium and/or capable of executing software. For example, a single shared digital signal processor may provide the function of blocks 312 and 314 or 315 and 317 of FIG. 3. Additionally, it should be understood that the functional blocks 312–318 in FIG. 3 can be performed by a single computer or processor system, e.g., signal processor 116 of FIG. 1.

Figure 4:
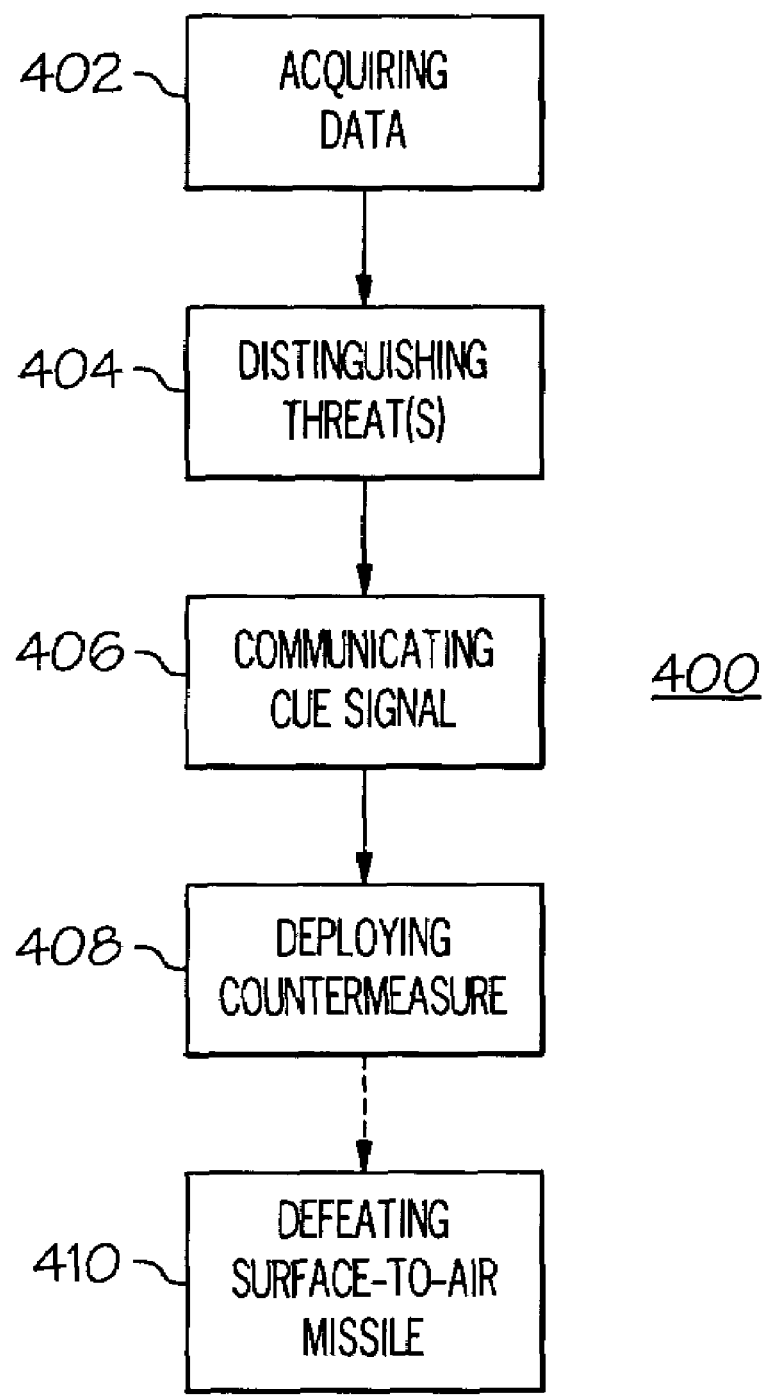
FIG. 4 is a flow chart for a method of deploying aircraft-based countermeasures.

Referring now to FIG. 4, a flow chart is shown for a method 400 of deploying an aircraft-based countermeasure. One example of a method using acoustic sensors will now be described using FIG. 4. Acoustic signals are acquired through data acquisition 402 from sensors deployed near an airfield, airport, landing corridor, and/or runway. The acoustic signals are analyzed or processed to distinguish 404 the presence of a threat to an airplane landing on, taking off from, or flying near an airfield, airport, landing corridor or runway. When a threat is detected, a cue signal is communicated 406 to an aircraft-based countermeasure system including one or more countermeasures. The aircraft-based countermeasure system then deploys 408 one or more countermeasures. The countermeasure may successfully defeat 410 the airborne threat, e.g., a surface-to-air missile, as an additional step 410 of the method 400.

Figure 5:
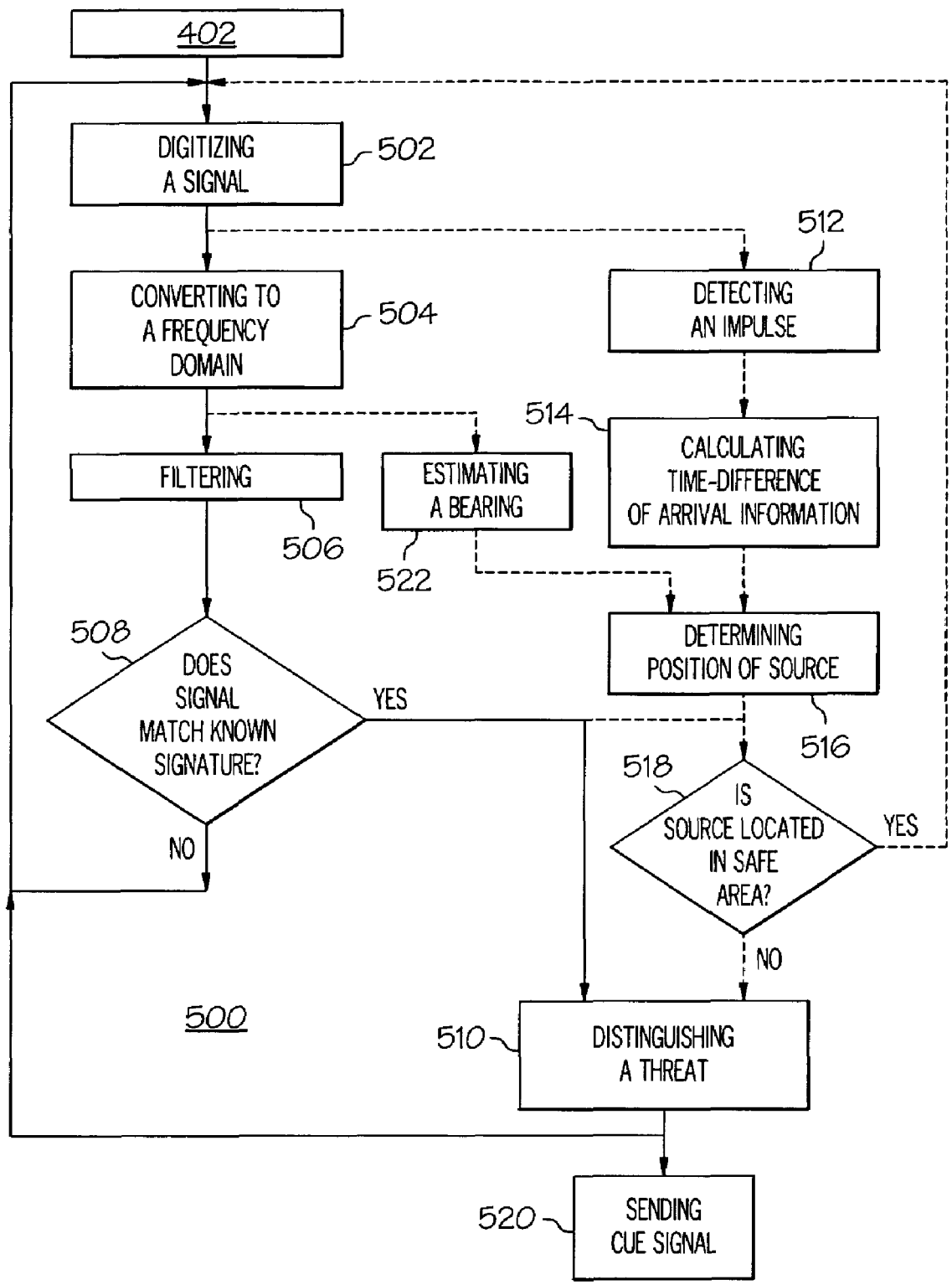
FIG. 5 is a flow chart of a method of additional steps that may be included in the step of distinguishing a threat of FIG. 4.

Referring now to FIG. 5, a method of signal processing 500 is shown which may be included in the step of distinguishing a threat 404 in the method 400. Signals or data are acquired, e.g., as in step 402 of FIG. 4, from one or more sensors and may be converted to a digital signal, or digitized 502, for example by use of known analog to digital (A/D) converters. The digital signal may be converted 504 to a frequency domain and filtered 506. The frequency components of the digital signal may be compared 508 to indicia, e.g., frequency components or acoustic signatures, of known surface-to-air missiles including MANPADS and other threats to determine whether the digital signal includes or matches such indicia of one or more known threats. For example, a threat is distinguished 510 if the digital signal matches a known hostile acoustic signature, similar to step 404 of FIG. 4. In such as case, a cue signal may be sent 520 to an aircraft-based countermeasure, as in step 406 of FIG. 4; The signals acquired from the sensors may be continuously monitored for either outcome of the comparison at step 508.

The step of comparing frequency components 508 may include, but is not limited to, cross correlating or match filtering. In certain embodiments, the step of comparing frequency components 508 may precede the step of filtering 506. In some embodiments, the step of comparing frequency components 508 may be included in the step of filtering 506. As one example of step 404 of FIG. 4, method 500 may be used to protect aircraft by distinguishing 510 the presence of surface-to-air missiles that are within the range of the sensor(s), which may be located for example near airports and runways.

Additional steps, indicated by dashed lines in FIG. 5, may be performed on acoustic signals in the time domain to determine positional information about an acoustic source within range of a surveillance system. After the analog-to-digital conversion or step of digitizing 502, certain embodiments may include a step of detecting an acoustic impulse 512 within the signals received by the surveillance system. Time-difference of arrival information of the acoustic impulse may then be calculated 514 and a location or position of an acoustic source of the impulse, e.g., a surface-to-air missile, may be determined 516. In certain embodiments, frequency domain information about the received signals may be used to estimate a bearing 522 of an acoustic source, and such a bearing may be used as an additional factor in the step of determining a position of an acoustic source 516.

The location of the acoustic source may be compared to the location of known secured or safe areas 518. A threat is distinguished 510 if the acoustic source is not within such a known safe or secured area, and a cue signal may be sent 520 to an aircraft-based countermeasure system. If the acoustic source is determined to be in a secure or safe area, then no threat is distinguished. For either outcome of comparison step 518, step 502 may be revisited and the signals from the sensors may be continuously monitored.

After an acoustic signature of a threat is detected by the comparison of frequency components 508, the positional information may be compared 518 to areas that are known to be safe or free of threats. If the detected acoustic signature is located within an area known to be safe, no threat is actually present and no cue signal is sent, e.g., step 406, to a countermeasure system and the method may return to step 502 to continuously monitor the signals from the sensors. If a detected acoustic signature matches that of a known surface-to-air missile and the position of the corresponding acoustic source is determined to be outside of a safe area, a threat is distinguished 510 and a cue signal may be sent to an aircraft-based countermeasure. The optional steps of determining the position of the acoustic source 516 and comparing to a known safe area 518 may reduce the likelihood of false alarms. Method 500 may be iterated as shown to continuously process signals received by sensors of a surveillance system.

In certain embodiments, position information such as bearing and distance may be calculated for detected acoustic sources and may be used advantageously to eliminate or reduce false alarms from "sound alike" sources, i.e., those that have similar acoustic signatures to surface-to-air missiles. By determining the location of an acoustic source detected by the sensor array and knowing that such sources are located in a secure area, i.e., one that is known to be safe or free of threats, such sources may be ruled out as potential threats by a threat-decision logic module.

With reference to FIGS. 1–5, use of an embodiment of the present invention will now be described. One or more surveillance systems, e.g., 110, may be deployed around near to an airport, airfield, landing corridor or runway. For example, sensor systems may be positioned a predetermined distance along the perimeter of a runway or of an airport. Additional surveillance systems may also be deployed on buildings or on the ground within or near landing corridors near such an airport.

The surveillance systems include acoustic sensors, which may include seismic and piezoelectric sensors. The surveillance systems may also include other types of sensors such as magnetic sensors, passive and active infrared sensors, and cameras. The processor system of the surveillance systems monitor the acoustic signals received by the sensors. When an acoustic signature of a surface-to-air missile, e.g., a MANPADS such as a SA-7, is indicated and is not excluded by any threat-decision logic, a cue signal is sent to aircraft-based countermeasure systems on aircraft landing or taking off from nearby runways. In response to the cue signal, the countermeasure systems deploy countermeasures such as chaff, jamming signals, expendable decoys, and/or flares to defeat the surface-to-air missile(s).

Planes such as commercial jet airliners that use the airport or landing fields may have countermeasure systems including one or more dispensers or pods located on their fuselages. The pods may include countermeasures such as chaff, radar jammers, decoys, or flares, and these countermeasures may be released, deployed or activated in response to the reception of a cue signal from one or more of the surveillance systems.

Accordingly, the present invention provides for the provides a surface-to-air missile defense for aircraft without requiring expensive, fully autonomous systems onboard each plane that is to be protected. One or more sensor systems that are deployed at a particular airfield, runway or airport may provide protection for aircraft using such facilities. Relatively inexpensive countermeasures may be placed onboard such aircraft and may be triggered automatically by the sensor systems.

In an exemplary embodiment, a surveillance system used may include a surveillance system sold under the trademark TERRAIN COMMANDER surveillance system. TERRAIN COMMANDER is a trademark owned by Textron Systems Corporation located at 201 Lowell Street, Wilmington, Mass. 01887. The TERRAIN COMMANDER surveillance system includes a field-deployed optical acoustic satellite-communication (satcom) integrated sensor (OASIS).

The TERRAIN COMMANDER surveillance system is man-portable and may consequently be hidden or camouflaged in locations around the perimeter of an airport, runway, landing corridor, or airfield. The TERRAIN COMMANDER has digital signal processing capability that is able to distinguish and differentiate between the acoustic signatures of known MANPADS. The TERRAIN COMMANDER surveillance system has a battery life of up to 90 days and has the capability to utilize seismic, magnetic, piezoelectric and passive infrared sensors in addition to acoustic sensors.

The TERRAIN COMMANDER surveillance system has acoustic detection range capabilities that include 500 meters for light trucks, 2500 meters for tanks, and 10,000 meters for helicopters. The TERRAIN COMMANDER surveillance system has an electro-optics recognition range capabilities that include 150 meters for personnel and 500 meters for ground vehicles.

In certain embodiments, the countermeasures dispenser or pod may be an AN/ALE-47 countermeasure dispenser made by BAE Systems Integrated Defense Solutions. The ALE-47 is a reprogrammable, computer-controlled system that can deploy chaff, expendable decoys and infrared flares. In certain embodiments, the MJU-50/B infrared countermeasure flare developed by Alloy Surface Company Inc. may also be used as a suitable flare.

In certain embodiments, suitable digital signal processors may include TMS320 digital signal processors (DSPs), including the TMS320 C2000, TMS320 C5000, and TMS320 C6000 platforms of DSPs, made or licensed by Texas Instruments Inc. Other suitable DSPs include, but are riot limited to, the ADSP21XX platform of DSPs made or licensed by Analog Devices, Inc., where "XX" indicates any number of digits in a model number of the particular platform. Suitable DSPs may include the ADSP21061 and ADSP21065 model DSPs made by Analog Devices, Inc. In certain embodiments, suitable analog-to-digital (A/D) converters may include, but are not limited to, AD1871, AD 1877, and AD 1870 A/D converters made or licensed by Analog Devices, Inc. and/or ADS12XX and ADS83XX platforms of converters made or licensed by Texas Instruments, Inc.

While the description of embodiments of the present invention has been generally directed to the cuing of aircraft-based countermeasures after the detection of characteristic acoustic signals of surface-to-air missiles including MANPADS, the scope of present invention includes other configurations. For example, the sensor array may also detect characteristic acoustic signals of air-to-air missiles, for example missiles fired from a helicopter.

Additionally, it will be understood that the steps of the methods described herein may be implemented in hardware and/or software or firmware such as computer-readable media. For example, analog-to-digital conversion, i.e., digitizing, and filtering including matched filtering may be implemented in central processing units (CPUs), application specific integrated circuitry (ASIC), field-programmable gate arrays (FPGAs), digital signal processors (DSPs), and/or stand-alone computers.

Within the scope of the present invention, embodiments may include microprocessor and or/or digital signal processor (DSP) hardware, read-only memory (ROM) for storing software performing the operations or functions described herein, and random-access memory (RAM) for storing results. Very large scale integration (VLSI) hardware embodiments, as well as application specific integrated circuits (ASIC) and field programmable gate arrays (FPGAs) may be utilized to perform functions described by the functional blocks within the scope of the present invention.

Those skilled in the art will understand that the present invention can be varied in many ways as will be apparent from the above description. The invention should therefore only be limited insofar as is required by the scope of the following claims.

The reader's attention is directed to all papers and documents that are filed concurrently with this specification and which are open to public inspection with this specification, and the contents of all such papers and documents are incorporated herein by reference. All the features disclosed in this specification, including any accompanying claims, abstract, and drawings, may be replaced by alternative features serving the same, equivalent or similar purpose, unless expressly stated otherwise. Thus, unless expressly stated otherwise, each feature disclosed is one example only of a generic series of equivalents or similar features.

What is claimed is:

1. A method for externally cuing one or more countermeasure systems within a vehicle and deploying one or more countermeasures, comprising the steps of:
   acquiring signals from one or more surveillance systems that are external to and physically spaced apart from the vehicle;
   distinguishing a threat from said signals;
   wirelessly transmitting a cue signal from said one or more surveillance systems to a receiver within the vehicle;
   activating, in response to said cue signal, the countermeasure system within the vehicle; and
   deploying said countermeasure.

2. The method of claim 1, wherein said step of acquiring signals is selected from the group consisting of acquiring radar signals, acquiring acoustic signals, acquiring magnetic signals, acquiring seismic signals, acquiring infrared signals, and acquiring visible light signals.

3. The method of claim 2, further comprising the step of preventing a surface-to-air missile from hitting an aircraft.

4. The method of claim 1, further comprising defeating an airborne threat.

5. The method of claim 4, wherein said step of defeating an airborne threat comprises defeating a surface-to-air missile.

6. The method of claim 1, further comprising sending a warning signal.

7. The method of claim 6, further comprising deploying a surveillance system in an area adjacent to an airport.

8. The method of claim 7, wherein said step of deploying comprises deploying a surveillance system adjacent to one or more runways of an airport.

9. The method of claim 1, wherein said step of distinguishing a threat further comprises converting an analog signal to a digital signal.

10. The method of claim 9, further comprising a step of converting said digital signal to a frequency domain.

11. The method of claim 10, wherein said step of converting said digital signal to a frequency domain includes implementing of a discrete Fourier transform (DFT).

12. The method of claim 11, wherein said step of convening said digital signal to a frequency domain includes implementing a fast Fourier transform (FFT).

13. The method of claim 1, wherein said step of distinguishing a threat further comprises comparing an acoustic signal to a known acoustic signatures of a known surface-to-air missile.

14. The method of claim 13, wherein said step of comparing further comprises filtering said acoustic signals.

15. The method of claim 14, wherein said step of filtering further includes using a matched filter corresponding to one or more known surface-to-air missiles.

16. The method of claim 14, wherein step of filtering further comprises using a digital filter.

17. The method of claim 16, wherein said step of using a digital filter further comprises using an infinite impulse response (IIR) filter or a finite impulse response (FIR) digital filter.

18. The method of claim 17, wherein said step of using a digital filter includes using a window function selected from the group consisting of a rectangular window function, a triangular window function, a Bartlett window function, a Hanning window function, a Hamming window function, a Blackman window function, a Kaiser window function, and a Chebyshev window function.

19. The method of claim 9, further comprising a step of determining position information for an acoustic source.

20. The method of claim 19, wherein said step of determining position information includes using time-difference of arrival calculations.

21. The method of claim 20, wherein said position information includes a distance or a bearing.

22. The method of claim 1, wherein said step of deploying a countermeasure comprises deploying an aircraft-based countermeasure.

23. The method of claim 22, wherein said step deploying a countermeasure selected from the group consisting of deploying flares, deploying chaff, and deploying infrared decoys.

24. The method of claim 1, wherein said step of deploying a countermeasure comprises deploying a ground-based countermeasure.

25. The method of claim 24, wherein said step of deploying a countermeasure comprises deploying an infrared decoy.

26. An externally cued countermeasure system within a vehicle and deploying one or more countermeasures comprising:
 a surveillance system external to and spaced apart from the vehicle operable to detect one or more signals and to wirelessly transmit a cue signal; and
 a countermeasure system within the vehicle operable to receive said cue signal from said surveillance system and to activate one or more countermeasures within the vehicle in response to said cue signal.

27. The system of claim 26, wherein said surveillance system comprises a sensor array.

28. The system of claim 27, wherein said sensor array includes one or more sensors selected from the group consisting of radar receivers, acoustic sensors, seismic sensors, magnetic sensors, and photodetectors.

29. The system of claim 28, wherein said sensors are acoustic sensors.

30. The system of claim 28, wherein said censors are photodetectors.

31. The system of claim 30, wherein said photodetectors include infrared detectors.

32. The system of claim 31, wherein said infrared detectors comprises a forward-looking infrared array (FLIR).

33. The system of claim 26, wherein said surveillance system further comprises a signal processor operable to process acoustic signals acquired by said sensor array.

34. The systems of claim 33, wherein said signal processor further comprises a matched filter, and wherein said signal processor is operable to process acoustic signals received by said sensor array and to distinguish the presence of one or more threats to said aircraft.

35. The system of claim 33, wherein said signal processor includes a digital signal processor.

36. The system of claim 26, wherein said surveillance system comprises a sensor field of sensor arrays, pre-positioned near a runway.

37. The system of claim 26, wherein said countermeasure system comprises a radar jammer onboard an aircraft.

38. The system of claim 26, wherein said system includes a computer-readable medium having computer-executable instructions stored thereon to distinguish one or more acoustic signatures of known surface-to-air missiles.

39. The system of claim 38, wherein said computer-readable medium comprises said computer-readable medium of claim 33.

40. The system of claim 38, wherein said surveillance system includes said computer-readable medium.

41. The system of claim 26, wherein said countermeasure system is an aircraft-based countermeasure system.

42. The system of claim 41, wherein said one or more countermeasures are selected from the group consisting of flares, infrared decoys, and chaff.

43. The system of claim 26, wherein said countermeasure system is a ground-based countermeasure system.

44. The system of claim 43, wherein said one or more countermeasures comprises infrared decoys.

* * * * *